United States Patent
Sandee et al.

(10) Patent No.: US 9,644,044 B2
(45) Date of Patent: May 9, 2017

(54) PROCESS AND CATALYST FOR RESIN HYDROGENATION

(71) Applicant: BASF Corporation, Florham Park, NJ (US)

(72) Inventors: Albertus Jacobus Sandee, De Meern (NL); Jogesh Chintada, De Meern (NL); Robert Johan Andreas Maria Terörde, De Meern (NL)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/904,793

(22) PCT Filed: Jul. 17, 2014

(86) PCT No.: PCT/IB2014/063181
§ 371 (c)(1),
(2) Date: Jan. 13, 2016

(87) PCT Pub. No.: WO2015/008247
PCT Pub. Date: Jan. 22, 2015

(65) Prior Publication Data
US 2016/0159941 A1  Jun. 9, 2016

(30) Foreign Application Priority Data
Jul. 17, 2013  (EP) .................................. 13176876

(51) Int. Cl.
C08F 8/04 (2006.01)
B01J 37/03 (2006.01)
(Continued)

(52) U.S. Cl.
CPC ............... *C08F 8/04* (2013.01); *B01J 23/755* (2013.01); *B01J 35/1038* (2013.01); *B01J 35/1061* (2013.01); *B01J 35/1066* (2013.01); *B01J 37/03* (2013.01); *B01J 37/06* (2013.01); *C10G 45/00* (2013.01); *C10G 45/06* (2013.01);
(Continued)

(58) Field of Classification Search
CPC .......... C08F 8/04; B01J 37/06; B01J 35/1066; B01J 35/1061; B01J 23/755; B01J 35/1038; B01J 37/03; B01J 35/108; B01J 37/18; B01J 33/00; B01J 2523/00; B01J 35/0053; B01J 35/1019; C10G 45/00; C10G 45/06
See application file for complete search history.

(56) References Cited

U.S. PATENT DOCUMENTS
4,532,351 A   7/1985   Barnett et al.

FOREIGN PATENT DOCUMENTS
| AU | 540819 | 12/1984 |
| WO | 01/36093 | 5/2001 |
| WO | 2004/035204 | 4/2004 |

OTHER PUBLICATIONS

International Search report for International Application No. PCT/IB2014/063181 dated Jan. 19, 2015, 3 pgs.

*Primary Examiner* — Anthony J Zimmer
(74) *Attorney, Agent, or Firm* — Lowenstein Sandler LLP

(57) ABSTRACT

The invention is in the field of catalysis. More specifically, the invention pertains to catalytic hydrogenation processes and catalysts used therein. According to the invention there is provided a process for the hydrogenation of hydrocarbon resins, in particular hydrocarbon resin feeds with a relatively high sulfur content using a cobalt promoted nickel on silica/alumina catalyst, the catalyst per se, and the process of preparing said catalyst.

13 Claims, 1 Drawing Sheet

(51) Int. Cl.
  *B01J 23/755* (2006.01)
  *B01J 35/10* (2006.01)
  *C10G 45/06* (2006.01)
  *C10G 45/00* (2006.01)
  *B01J 37/06* (2006.01)
  B01J 35/00 (2006.01)
  B01J 37/18 (2006.01)
  B01J 33/00 (2006.01)

(52) U.S. Cl.
  CPC ............ *B01J 33/00* (2013.01); *B01J 35/0053* (2013.01); *B01J 35/108* (2013.01); *B01J 35/1019* (2013.01); *B01J 37/18* (2013.01); *B01J 2523/00* (2013.01)

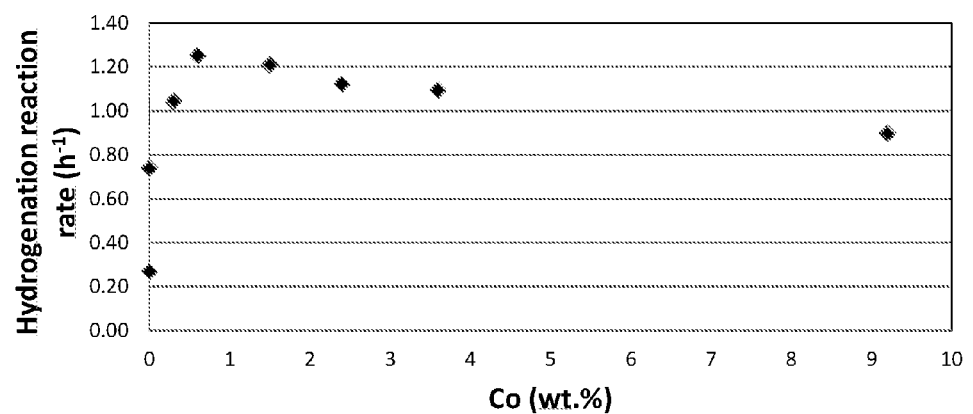

US 9,644,044 B2

PROCESS AND CATALYST FOR RESIN HYDROGENATION

CROSS REFERENCE TO RELATED APPLICATIONS

This application is a National Phase Application of PCT International Application No. PCT/IB2014/063181, filed on Jul. 17, 2014, claiming priority of European Patent Application No. 13176876.4, filed on Jul. 17, 2013, which are hereby incorporated by reference in their entirety.

BACKGROUND OF THE INVENTION

The invention is in the field of catalysis. More specifically, the invention pertains to catalytic hydrogenation processes and catalysts used therein.

WO-A-01/36093 describes nickel-iron-silica-alumina catalysts for the hydrogenation of hydrocarbon resins. These and other prior art nickel hydrogenation catalysts have a low activity in hydrocarbon resin feed, in particular when the sulfur level in the feed exceeds 100 ppm. Accordingly there is a need for a catalyst and process wherein it is possible to obtain good catalytic activity in hydrogenation of hydrocarbon resins at higher levels of sulfur.

Accordingly it is an object of the invention to provide a catalyst and process for the hydrogenation of hydrocarbon resins, wherein this advantage is obtained. A further object is to provide a process for the preparation of such a catalyst. It is also an object of the invention to provide a catalyst suitable for the hydrogenation of hydrocarbon resins which is cost effective.

U.S. Pat. No. 4,263,225 describes nickel-cobalt-silica and nickel-cobalt-copper-silica hydrogenation catalysts, as well as processes for hydrogenating monomeric aromatic compounds wherein these catalysts are used. Hydrogenation of hydrocarbon resins is not suggested in this document.

U.S. Pat. No. 3,945,944 describes a cobalt promoted nickel catalyst supported on a refractory material and use thereof in the production of hydrogen containing or methane enriched gases. Like U.S. Pat. No. 4,263,225, this document also does not suggest the hydrogenation of hydrocarbon resins.

U.S. Pat. No. 4,532,351 describes a process for hydrogenating organic compounds, such as olefins, using catalysts comprising nickel, cobalt, copper, aluminium oxide and silica. U.S. Pat. No. 4,532,351 also describes that such catalysts may be suitable for hydrodesulfurization processes. However, this document does not suggest hydrogenation of hydrocarbon resins.

WO-A-2004/035204 describes a magnesium promoted nickel catalyst suitable for hydrogenation of unsaturated organic compounds, particularly fatty oils having a high sulfur content. WO-A-2004/035204 also describes a catalyst comprising nickel, silica, alumina and cobalt which is not suitable for said hydrogenation reaction. No suggestion is made in this document of hydrogenation of hydrocarbon resins.

AU-B-66865/81 describes a supported co-precipitated catalyst from salts of aluminium, one or more non-ferrous metals of Group VIII and solid porous particles and method of preparation thereof. AU-B-66865/81 does not suggest the hydrogenation of hydrocarbon resins, let alone hydrocarbon resins containing sulfur containing compounds.

BRIEF SUMMARY OF THE INVENTION

The present inventors found that cobalt promoted nickel on silica/alumina catalysts are very suitable in the hydrogenation of hydrocarbon resins, in particular hydrocarbon resin feeds with a relatively high sulfur content.

Thus in a first aspect, the present invention is directed to a process for the hydrogenation of a hydrocarbon resin feed containing one or more sulfur compounds, which process comprises the steps of contacting said hydrocarbon resin feed with hydrogen in the presence of a catalyst, wherein said catalyst is a cobalt promoted supported nickel on silica and alumina catalyst, said catalyst having a nickel content, calculated as Ni of 45 to 85 wt. %; a silicon content, calculated as $SiO_2$, of 13.75-45 wt. %; an aluminum content, calculated as $Al_2O_2$, of 1-15 wt. %; and a cobalt content, preferably in an amount calculated as Co, of 0.25-12 wt. %; and which catalyst preferably has a pore volume between 2 and 60 nm of at least 0.35 ml/g, and more preferably between 10 and 60 nm of at least 0.20 ml/g of the catalyst.

All weight percentages pertaining to the catalyst as used herein are calculated on the basis of the reduced catalyst. All ppm values as used herein are based on weight, unless otherwise indicated.

The invention is furthermore directed to the above mentioned catalysts per se as well as to processes for using them.

DETAILED DESCRIPTION OF THE INVENTION

Surprisingly it has been found that the catalysts of the present invention provide enhanced activity in a sulfur compound containing hydrocarbon resin feed compared to those formulations that do not contain the cobalt promoter. More surprisingly, it was found that the amount of cobalt promoter can be very low. This provides a significant economic costs savings over known hydrogenation resin catalysts.

In accordance with the present invention the cobalt content is preferably an amount, calculated as Co, of 0.25-12 wt. %, more preferably an amount, calculated as Co, of 0.25-4.5 wt. % and even more preferably an amount, calculated as Co, of about 0.3-4 wt. %. Surprisingly it was found that only about 0.3 wt. % cobalt led to an increase of >40% of the activity of the catalyst as compared to that of a non promoted nickel catalyst. Even more surprising it was found that such low amounts of cobalt led to an increase of about 300% of the activity of the catalyst as compared to that of the non-cobalt promoted analogue of WO-A-01/36093.

Without wishing to be bound by any theory, it is assumed that the promotional effect of the cobalt in the supported nickel catalyst stems from the increased level of disorder in the Ni-crystallite lattice, which in turn can provide an enhancement of the level of sulfur tolerance of the catalyst.

The present invention is accordingly also directed to a cobalt promoted supported nickel on silica and alumina catalyst, wherein said catalyst has a nickel content, calculated as Ni of 45 to 85 wt. %; a silicon content, calculated as $SiO_2$, of 13.75-45 wt. %; an aluminum content, calculated as $Al_2O_3$, of 1-15 wt. %; and a cobalt content, calculated as Co, of 0.25-1.5 wt. %; and which catalyst preferably has a pore volume between 2 and 60 nm of at least 0.35 ml/g of catalyst, and more preferably between 10 and 60 nm of at least 0.20 ml/g of the catalyst.

The nickel content of the catalyst is typically between 45 and 85 wt. %, and preferably between 55 and 75 wt. %. Within these ranges the optimum for activity and selectivity is obtained.

The support material is a combination of silica and alumina. This may be a mixture of the two components, but is also possible that the silicon and aluminum ions are at least partly in the same crystal lattice.

The BET surface area of the catalyst of the invention is preferably between 200 to 350 m$^2$/g. The BET surface area, as used herein, is the value that can be measured by determining the amount of nitrogen adsorbed at 77K and P/Po of approximately 0.3 and assuming a nitrogen cross section area of 16.2 Å$^2$, after degassing the catalyst sample at 180° C. on a Micromeritics ASAP 2420.

Typically the catalyst of the present invention has a pore volume between 2 and 60 nm of at least 0.35 ml/g of catalyst, and preferably between 10 and 60 nm of at least 0.20 ml/g of the catalyst. The pore volume, as used herein, is measured on a Micromeritics ASAP 2420 by N$_2$ desorption in pore diameters between 2 and 200 nm using an outgas temperature of 300° C. and pressure of <15 μm Hg and assuming that the pores are cylindrical, on samples which are calcined for 1.5 hours at 375° C.

The level of S-poisoning is expressed as the percentage of nickel poisoned in the used reaction medium. This is obtained by determining the reaction rate of the catalyst hydrogenating the hydrocarbon resin as a function of the nickel content in wt. % of the catalyst. The intersection with the x-axis gives rise to the threshold; the lowest level of nickel in wt. % of the catalyst at which there is no hydrogenation activity. Typically in this function the lower the level of S-poisoning the higher the S-tolerance of the catalyst.

The reaction rate of the catalyst hydrogenating the hydrocarbon resin is expressed by the reaction rate constant, which is obtained from performing a linear regression between 30% and 70% conversion expressed in 1/h.

The hydrogen adsorption capacity (HAC) is a common measure to determine the level of nickel surface area available for catalysis. The catalyst of the invention typically has a HAC ranging from 15 to 25 ml H$_2$/g catalyst. After in-situ reduction with hydrogen at a temperature ramp to 375° C. of 10° C./min and a hold for 2 hours at 375° C.; and subsequently degassing for 45 minutes at −75° C. with argon, the HAC is determined by the amount of hydrogen desorbed while ramping up the temperature from −75° C. to 700° C. with a rate of 10° C./min under argon atmosphere.

The catalyst of the invention may be in the form of a powder, particles, granules and shaped bodies, such as spheres, extrudates or tablets. Preferably, the catalyst of the invention is a powder catalyst.

The catalyst according to the invention can be prepared by various methods, such as impregnation or precipitation of the active components on a preformed silica and alumina containing support, or precipitation on the said support.

It is, however, preferred to prepare the supported catalyst by coprecipitation. This comprises precipitating the catalyst components, (catalyst precursors) from solutions, in particular from solutions of one or more nickel salts, cobalt salts, aluminum salts and one or more silicon compounds, and optionally other components, such as, iron salts, zinc salts and magnesium salts and combinations thereof, usually by raising or maintaining the pH above about 7.0 by adding a base or by electrochemical means. Usual techniques may be applied, such as adding all solutions at the same time to the precipitation vessel, or providing one or more components therein and adding the others to the vessel.

The present invention is accordingly also directed to a process for preparing a supported nickel on silica and alumina catalyst of the above mentioned types, said process comprising coprecipitating the catalyst components at a pH-value of 7.0-9.0, recovering the coprecipitated material from the precipitation liquid, washing it and further treating it to produce the catalyst.

After precipitation the precipitate may subsequently be filtered off, washed and further treated as needed. This may include calcination, reduction, passivation or combinations thereof.

In the present invention various hydrocarbon resin feedstocks may be used. Hydrocarbon resin feeds which may be used are typically produced from C5 or C9 petroleum fractions and by-products, as well as combinations thereof, through distillation, pretreatment and polymerization. Such hydrocarbon resins typically are low molecular weight polymers (between 300-3000 Daltons) comprising an aliphatic backbone and optionally one or more aromatic and/or aliphatic side groups.

The hydrocarbon resin feed suitable to be used in the process of the present invention typically contains one or more sulfur compounds. The sulfur compound content of the hydrocarbon resin feed is typically more than 40 ppm, and preferably more than 100 ppm, calculated as sulfur, based on the weight of the hydrocarbon resin feed.

Without wishing to be bound by theory it is believed that the sulfur compounds present in the hydrocarbon resin feed are in the hydrocarbon resin molecules.

The process according to the invention also comprises hydrogenating a hydrocarbon resin feed, particularly a hydrocarbon resin feed containing one or more sulfur compounds, using the catalyst described above. Suitable temperatures and pressures are based on the properties of the resin, the properties required of the end-product and the actual composition and structure of the catalyst.

Suitable temperatures are generally between 100 and 350° C., preferably between 250 and 325° C. Suitable partial hydrogen pressures can be between 1 and 150 bar (abs). The hydrogenation time is mainly dependent on the temperature, amount of catalyst and required degree of hydrogenation of the resin.

The process is preferably carried out in a batch, wherein the catalyst is dispersed in the hydrocarbon resin as powder. Suitable particle sizes of the powder catalyst of the invention are between 1 and 1000 μm. The loading of fresh catalyst in the hydrogenation process is usually between 0.25 and 4 wt. % relative to the resin.

The process can be carried out in various reactors suitable for slurry hydrogenation, such as stirred tank reactors (optionally cascaded) or loop reactors.

Use of the catalyst as described above results in a hydrogenation of the hydrocarbon resin to a product having a carefully balanced set of properties, both chemically and physically. At the same time the hydrogenation results in a decrease of the amount of impurities in the final product.

The present invention is now elucidated on the basis of the following examples.

Example 1 (Comparative)

A nickel catalyst was prepared according to WO-A-01/36093 by mixing solutions containing nickel, iron and alumina salts, silicate and sodium carbonate in a well stirred precipitation vessel at a temperature of 95° C. The pH of the slurry formed was about 7.5 and after 1 hour the precipitation was completed. After washing the precipitate, the precursor of the catalyst was filtered and dried in an oven at 110° C. The catalyst was activated with hydrogen and passivated in the presence of air. The composition and the physical properties of the resulting catalyst are specified in Table 1.

Example 2 (Comparative)

Solutions containing nickel and alumina salts, silicate and sodium carbonate were mixed in a well stirred precipitation vessel at a temperature of 95° C. The pH of the slurry formed was about 7.5 and after 1 hour the precipitation was completed. After washing the precipitate, the precursor of the catalyst was filtered and dried in an oven at 110° C. The catalyst was activated with hydrogen and passivated in the presence of air. The composition and the physical properties of the resulting catalyst are specified in Table 1.

Example 3

Solutions containing nickel, cobalt and alumina salts, silicate and sodium carbonate were mixed in a well stirred precipitation vessel at a temperature of 95° C. The pH of the slurry formed was about 7.5 and after 1 hour the precipitation was completed. After washing the precipitate, the precursor of the catalyst was filtered and dried in an oven at 110° C. The catalyst was activated with hydrogen and passivated in the presence of air. The resulting material contained 64 wt. % Ni, 25 wt. % $SiO_2$, 2 wt. % $Al_2O_3$ and 0.3 wt. % Co. Further physical properties of the resulting catalyst are specified in Table 1.

Example 4

A catalyst was prepared according to Example 3 but using different concentrations of solutions containing nickel, cobalt and alumina salts, silicate and sodium. The resulting material contained 61 wt. % Ni, 25 wt. % $SiO_2$, 2 wt. % $Al_2O_3$ and 0.6 wt. % Co. Further physical properties of the resulting catalyst are specified in Table 1.

Example 5

A catalyst was prepared according to Example 3 but using different concentrations of solutions containing nickel, cobalt and alumina salts, silicate and sodium carbonate. The resulting material contained 59 wt. % Ni, 25 wt. % $SiO_2$, 2 wt. % $Al_2O_3$ and 1.5 wt. % Co. Further physical properties of the resulting catalyst are specified in Table 1.

Example 6

A catalyst was prepared according to Example 3 but using different concentrations of solutions containing nickel, cobalt and alumina salts, silicate and sodium carbonate. The resulting material contained 61 wt. % Ni, 25 wt. % $SiO_2$, 2 wt. % $Al_2O_3$ and 2.4 wt. % Co. Further physical properties of the resulting catalyst are specified in Table 1.

Example 7

A catalyst was prepared according to Example 3 but using different concentrations of solutions containing nickel, cobalt and alumina salts, silicate and sodium carbonate. The resulting material contained 59 wt. % Ni, 25 wt. % $SiO_2$, 2 wt. % $Al_2O_3$ and 3.7 wt. % Co. Further physical properties of the resulting catalyst are specified in Table 1.

Example 8

A catalyst was prepared according to Example 3 but using different concentrations of solutions containing nickel, cobalt and alumina salts, silicate and sodium carbonate. The resulting material contained 56 wt. % Ni, 25 wt. % $SiO_2$, 2 wt. % $Al_2O_3$ and 9.2 wt. % Co. Further physical properties of the resulting catalyst are specified in Table 1.

Example 9

Testing of the Catalysts 75 g of a 50 wt. % hydrocarbon resin (containing 140 ppm S compounds, calculated as sulfur based on the weight of the hydrocarbon resin) solution in Shellsol D40 mixed with 0.75 grams of a nickel catalyst was heated in an autoclave under 20 bars hydrogen and agitated at 1400 rpm. As soon as the temperature reached 270° C., the hydrogen pressure was increased to 80 bar. The subsequent hydrogenation process was monitored by recording the hydrogen consumption. The reaction rate of the catalyst hydrogenating the hydrocarbon resin is expressed by the reaction rate constant, which is obtained from performing a linear regression between 30% and 70% conversion, and is expressed in 1/h. After 2 hours the hydrogenation process is finished. The catalysts described in the Examples 1-8 were subject to the above described activity test. The results of these tests are specified in Table 1. The total weight percent in Table 1 for the Examples does not add up to 100 wt. % because of the metals in the catalyst being partially oxidized, and therefore containing additional oxygen atoms. This oxygen content is not listed in Table 1 below.

TABLE 1

| Example | | 1 | 2 | 3 | 4 | 5 | 6 | 7 | 8 |
|---|---|---|---|---|---|---|---|---|---|
| Ni | wt. % | 62 | 62 | 64 | 61 | 59 | 61 | 59 | 56 |
| Co | wt. % | 0 | 0 | 0.3 | 0.6 | 1.5 | 2.4 | 3.7 | 9.2 |
| Fe | wt. % | 1.7 | 0 | 0 | 0 | 0 | 0 | 0 | 0 |
| $SiO_2$ | wt. % | 25 | 25 | 25 | 25 | 25 | 25 | 25 | 25 |
| $Al_2O_3$ | wt. % | 2 | 2 | 2 | 2 | 2 | 2 | 2 | 2 |
| Pore volume (2-60 nm) | ml/g | 0.51 | 0.57 | 0.49 | 0.53 | 0.53 | 0.54 | 0.48 | 0.53 |
| BET surface area | $m^2/g$ | 259 | 280 | 277 | 284 | 283 | 283 | 259 | 274 |
| HAC | ml $H_2$/g catalyst | 17.9 | 18.8 | 17.8 | 18.4 | 17.7 | 18.3 | 18.1 | 20.0 |
| Reaction rate hydrogenation | $h^{-1}$ | 0.27 | 0.74 | 1.04 | 1.25 | 1.21 | 1.12 | 1.09 | 0.90 |
| Level of S-poisoning | wt. % Ni | 83 | 64 | 61 | 55 | 60 | 61 | 61 | 66 |

Table 1 shows that the catalysts of the invention in Examples 3-8 have an improved hydrogenation reaction rate and an improved tolerance for S-poisoning compared to the non-promoted catalyst in Example 2 and the iron promoted catalyst in Example 1. Table 1 also shows that an improved S-tolerance may be obtained using a very low cobalt content of only 0.3 wt. % (see Table 1, Example 3).

FIG. 1 also shows that the catalysts of the invention in Examples 3-8 have an improved hydrogenation reaction rate compared to the non-promoted catalyst in Example 2.

The invention claimed is:

1. A process for hydrogenation of a hydrocarbon resin feed containing one or more sulfur compounds, the process comprising:
   contacting said hydrocarbon resin feed with hydrogen in the presence of a catalyst,
   wherein said catalyst is a cobalt promoted supported nickel on silica and alumina catalyst, said cobalt promoted catalyst having
      a nickel content, calculated as Ni of 45 to 85 wt. %;
      a silicon content, calculated as $SiO_2$, of 13.75-45 wt. %; and
      an aluminum content, calculated as $Al_2O_3$, of 1-15 wt. %,
   based on the weight of the reduced catalyst.

2. The process according to claim 1, wherein said catalyst has a cobalt content, calculated as Co, of 0.25-12 wt. %, based on the weight of the reduced catalyst.

3. The process according to claim 1, wherein said catalyst has a pore volume in pores with a size between 2 and 60 nm of at least 0.35 ml/g of catalyst.

4. The process according to claim 1, wherein the one or more sulfur compound content of the hydrocarbon resin is more than 40 ppm, calculated as sulfur, based on the weight of the hydrocarbon resin feed.

5. The process according to claim 3, wherein said catalyst has a pore volume in pores with a size between 10 and 60 nm of at least 0.20 ml/g of catalyst.

6. The process according to claim 4, wherein the one or more sulfur compound content of the hydrocarbon resin is more than 100 ppm, calculated as sulfur, based on the weight of the hydrocarbon resin feed.

7. A cobalt promoted supported nickel on silica and alumina catalyst, wherein said catalyst comprises:
   a nickel content, calculated as Ni of 45 to 85 wt. %;
   a silicon content, calculated as $SiO_2$, of 13.75-45 wt. %;
   an aluminum content, calculated as $Al_2O_3$, of 1-15 wt. %; and
   a cobalt content, calculated as Co, of 0.25-1.5 wt. %,
based on the weight of the reduced catalyst.

8. The catalyst according to claim 7, wherein the catalyst has a pore volume in pores with a size between 2 and 60 nm of at least 0.35 ml/g of catalyst.

9. The catalyst according to claim 8, wherein the catalyst has a pore volume in pores with a size between 10 and 60 nm of at least 0.20 ml/g of the catalyst.

10. A process for preparing a cobalt promoted supported nickel on silica and alumina catalyst, said process comprises:
   coprecipitating one or more nickel salts, cobalt salts, aluminum salts and one or more silicon compounds at a pH-value of 7.0-9.0,
   recovering the coprecipitated material from the precipitation liquid,
   washing the recovered coprecipitated material; and
   treating the washed recovered coprecipitated material to produce said catalyst,
   wherein said catalyst comprises:
      a nickel content, calculated as Ni of 45 to 85 wt. %;
      a silicon content, calculated as $SiO_2$, of 13.75-45 wt. %;
      an aluminum content, calculated as $Al_2O_3$, of 1-15 wt. %; and
      a cobalt content, calculated as Co, of 0.25-4 wt. %
   based on the weight of the catalyst.

11. The process according to claim 10, wherein said catalyst has a cobalt content, calculated as Co, of 0.25-1.5 wt. %, based on the weight of the catalyst.

12. The process according to claim 10, wherein said catalyst has a pore volume between 2 and 60 nm of at least 0.35 ml/g of catalyst.

13. The process according claim 12, wherein said catalyst has a pore volume in pores with a size between 10 and 60 nm of at least 0.20 ml/g of catalyst.

* * * * *